United States Patent [19]

Reardon

[11] 4,329,278
[45] May 11, 1982

[54] MOLDING COMPOSITIONS

[75] Inventor: Joseph E. Reardon, Wilmington, Del.

[73] Assignee: E. I. Du Pont de Nemours and Company, Wilmington, Del.

[21] Appl. No.: 242,585

[22] Filed: Mar. 11, 1981

[51] Int. Cl.³ .................. C08K 3/04; C08G 67/02
[52] U.S. Cl. .................. 524/523; 524/524; 525/185; 525/190; 525/451
[58] Field of Search ........... 260/42.49, 42.43, 42.52; 525/185, 190, 451

[56] References Cited

U.S. PATENT DOCUMENTS

| | | | |
|---|---|---|---|
| 3,780,140 | 12/1973 | Hammer | 260/884 |
| 3,873,494 | 3/1975 | Lewis | 260/42.44 |
| 4,046,728 | 9/1977 | Harmuth | 525/185 |
| 4,071,490 | 1/1978 | Andrascheck | 260/23 |
| 4,123,585 | 10/1978 | Sparzak | 525/185 |
| 4,129,536 | 12/1978 | Martin et al. | 260/23 |
| 4,151,132 | 4/1979 | Khanna | 260/23 |
| 4,168,256 | 9/1979 | Khanna | 260/33 |
| 4,228,050 | 10/1980 | Martin et al. | 260/42.49 |

FOREIGN PATENT DOCUMENTS 695883 10/1964 Canada ........................ 525/185
2028837 3/1980 United Kingdom .

OTHER PUBLICATIONS

Chem. Abst. vol. 84 (106551e), 1976, Harasawa–Cord Co.
Chem. Abst. vol. 93 (205433b), 1980, Bair et al.–Bell Labs.
Chem. Abs. vol. 91 (5776w), 1979, Anderson et al.–Bell Labs.
Chem. Abs. vol. 88 (137338c), 1978, Robeson et al.–Union Carbide.
Derwent Abst. 32926y/19, DT2548371, May 5, 1977, Datwyler.

Primary Examiner—Herbert J. Lilling

[57] ABSTRACT

A blend of polyvinyl chloride, a methacrylate, acrylate or styrene polymer, selected ethylene terpolymers, and carbon black is useful to make polyvinyl chloride molded articles.

7 Claims, No Drawings

MOLDING COMPOSITIONS

FIELD OF THE INVENTION

This invention relates to polyvinyl chloride molding resins.

BACKGROUND OF THE INVENTION

Polyvinyl chloride (PVC) homopolymers and copolymers are useful in a wide variety of applications, such as in making pipe, phonograph records or video discs. For use in records or video discs the PVC polymers are molded in the form of a disc and are grooved to carry a signal. Carbon black is distributed throughout to impart conductivity. The carbon black must be well dispersed to achieve good conductivity, and the blend may have to be held for extended periods of time under high shear during mixing for good dispersion. During the high shear, the blend temperature rises. This can cause decomposition of the blend ingredients.

Moreover, PVC polymers which contain carbon black can be difficult to mold. The high melt viscosity of PVC polymers renders compression molding difficult and the carbon black tends to embrittle the molded articles.

Components which reduce high melt viscosity can be added, but such components usually result in either lack of compatibility, embrittlement, reduced thermal stability or partial loss of conductivity in the final PVC product. In addition, such components are often fugitive or volatile and can result in mold deposits.

SUMMARY OF THE INVENTION

The PVC blends of this invention have reduced melt viscosity over PVC/carbon black mixtures, have higher heat distortion temperatures over those of PVC/carbon black blends alone, and do not cause mold deposits or substantial loss of conductivity. Moreover, the blends of this invention do not cause embrittlement of articles molded from the PVC compositions.

Specifically the compositions of this invention are blends of polyvinyl chloride which contain
  (a) about 5-25 percent by weight of blend of at least one acrylic polymer having a glass transition temperature (Tg) of between about 45°-105° C. and an inherent viscosity between 0.-0.6, said polymer containing units derived from

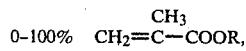
0-100%  $CH_2=C-COOR$,

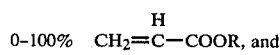
0-100%  $CH_2=C-COOR$, and 0-50%  styrene, in which the total percent of the monomer units is 100% and R is alkyl of 1-18 carbons, and at least one of the first two monomers is present;
  (b) about 1-10% by weight of blend of a high melt index terpolymer derived from units (by weight) of 60-80% ethylene, 5-60% copolymerizable unsaturated monomer, and 3-30% carbon monoxide, said terpolymer having a melt index over 20;
  (c) about 1-15% by weight of blend of a low melt index terpolymer derived from units (by weight) of 60-80% ethylene, 5-60% copolymerizable unsaturated monomer, and 3-30% carbon monoxide, said terpolymer having a melt index less than 1;
  (d) about 2-20% by weight carbon black.

DESCRIPTION OF THE INVENTION

The acrylic polymer defined in (a) above is employed to reduce the melt viscosity of the PVC/carbon black in order to render the PVC/carbon black blend more easily molded, and the polymer should have a glass transition temperature between 45°-105° C., preferably between 70°-90° C., to prevent brittleness in the PVC blend. In addition, the polymer should have an inherent viscosity between 0.1-0.6 for good flowability in the melt. The acrylic or methacrylic monomers used to make the polymers can be n-butylmethacrylate, 2-ethylhexyl acrylate, methylmethacrylate, ethyl acrylate, acrylic acid, methacrylic acid, ethyl methacrylate, n-butyl acrylate, isobutylmethacrylate, n-butyl acrylate, and the like. Preferably the polymer is a copolymer of methyl methacrylate and butyl methacrylate in a proportion of 50/50 to 85/15. When the final PVC blend is used in electronic applications such as video discs, electrical conductivity is important, and the acrylic polymer should be substantially free of residual salt which may have been used when the acrylic polymers are prepared by suspension or emulsion polymerization processes. Accordingly, in such applications, the polymerization procedure used to make the acrylic polymer should employ a salt-free granulation agent. It is understood that the R groups within any formula provided in part (a) of the summary may be alike or different.

Preferably the acrylic polymer will comprise units derived from

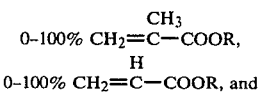
0-100%  $CH_2=C-COOR$,
0-100%  $CH_2=C-COOR$, and most preferably the acrylic polymer will comprise units derived from 100%

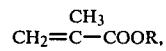
$CH_2=C-COOR$, especially those in which the R groups are different. It is understood that the acrylic polymer may contain small amounts of units derived from other usual ethylenically unsaturated monomers copolymerizable with methyl methylacrylate, methyl acrylate or styrene provided the glass transition temperature and the inherent viscosity of the resulting acrylic polymer are within the ranges recited above.

The terpolymers defined in (b) and (c) above are both copolymers of ethylene, a copolymerizable unsaturated monomer and carbon monoxide. These ethylene terpolymers preferably contain by weight 56-76% ethylene, 3-15% carbon monoxide and 10-34% copolymerizable unsaturated monomer. Preparation of these terpolymers is described in Hammer U.S. Pat. No. 3,780,140. The terpolymers having a melt index of less than 1, and preferably 0.1 to 1, are employed in the compositions of this invention as an impact modifier to lessen the brittleness of the PVC/carbon black blend caused by presence of the acrylic copolymer. The other terpolymer, i.e., the polymer having a melt index greater than 20, preferably 35-500, is employed as a plasticizer. The copolymerizable unsaturated monomers used in the terpolymers are copolymerizable ethylenically unsaturated organic compounds. Such monomers can be unsaturated mono- and dicarboxylic acids of 3–20 carbon atoms, esters of such unsaturated mono- or dicarboxylic acids, vinyl esters of saturated carboxylic acids wherein the acid group has 1–18 carbon atoms, vinyl alkyl ethers wherein the alkyl group has 1–18 carbon atoms, acrylonitrile, methacrylonitrile, copolymerizable unsaturated hydrocarbons such as alpha-olefins of 3–12 carbon atoms, ring compounds such as norbornene and vinyl aromatic compounds. Preferably the copolymerizable monomer is a vinyl ester of a saturated carboxylic acid, such as vinyl acetate.

The blend is prepared by mixing the ingredients together by dryblending or by melt blending in a suitable mixer such as a Banbury mixer. Any combination of ingredients may be blended and then additional ingredients added. For example, the two ethylene/copolymerizable unsaturated monomer/carbon monoxide terpolymers may be preblended if desired.

Preferably, however, the ethylene terpolymer having a melt index less than 1 is preblended in a Banbury mixer with some of the acrylic polymer and carbon black and ground to a powder. This ground product is then mixed with additional acrylic polymer and the ethylene terpolymer having a melt index over 20, that has been preground also. The resulting material is then melt blended with polyvinyl chloride.

The carbon blacks employed herein are preferably ones that are highly electrically conductive, finely divided low bulk density carbon blacks. The carbon black particles preferred for conductive applications have a high surface area to enable current to flow between the particles in an efficient manner. Coarse particles of carbon will usually require higher loading to achieve adequate conductivity. The particle size of such highly conductive carbon black is not critical but in general the particle size should be less than 500 angstroms to prevent the formation of a grainy surface in the plastic matrix. An amount of from about 12–20 percent by weight of a carbon black such as Ketjenblack EC is preferred.

The components are added to PVC to make a resin useful in molding into shaped articles. In such resins the PVC will usually comprise 50 to 90% by weight. The resin can be prepared simply by dry mixing the components with PVC in any suitable blender followed by melt compounding. The blend can be pelletized for ease of handling and can be used in pellet form for injection or compression molding.

The polyvinylchloride (PVC) resins suitable for use herein include polymers and copolymers of vinyl chloride and mixtures thereof. In order to produce the desired characteristics in conductive molded articles, the PVC resin preferably should have a high heat distortion temperature, preferably 140° F. (60° C.) or higher. Suitable polymers include homopolymers of vinyl chloride or vinyl chloride-propylene copolymers.

Other additives may be present in the compositions of this invention or in the PVC blend. For example, stabilizers may be added, such as organo tin compounds such as dibutytinmercaptopropionate, dibutyltin maleate and the like and other metallic compounds derived from metals such as lead, zinc, barium and cadmium stearates. Epoxides, phosphites and alkylated phenols such as t-butylcatechol can also be employed.

Suitable additional lubricant additives may be employed such as fatty acids and esters of alcohols and fatty acids, polyfunctional acid and alcohol esters, soaps such as zinc, lead or calcium stearate and the like, fatty acid amides such as stearamide, oleamide, ethylene bis stearamide and the like.

The following Examples illustrate the invention. In the Examples

Melt viscosity—was determined at 190° C. using a Plastograph made by C. W. Brabender Instruments, Inc., to measure torque in meter-grams (M-G).

Thermal properties—Tg in °C. was measured using a Du Pont 990 Thermal Analyzer with a Differential Scanning Calorimeter cell and the heat distortion temperature (HDT) was determined following the procedure of ASTM-D-648 on 5"×0.5"×⅛" bars compression molded at 190° C. with a three minute preheat and then five minutes at 40,000 psig and rapidly cooled to room temperature.

Tensile properties—were determined on similarly prepared compression molded bars using ASTM Method D-790 with a crosshead speed=0.05 in/min. The work-to-break, was determined as the arithmetic product of the maximum stress measured in mPa times the percent strain at maximum (%XmPa).

EXAMPLES 1–8

1120 g of an ethylene (E)/vinyl acetate (VA)/carbon monoxide (CO) copolymer (71/26/3 weight percent proportion) with a melt index of 0.3 was dry blended with 240 g of an acrylic polymer composed of a methyl methacrylate (MMA)/n-butyl methacrylate (BMA) copolymer (70/30 weight percent) with an inherent viscosity (IV) of 0.18, and 240 g of Ketjenblack EC carbon black.

This dry blended mixture was mixed for 5 minutes in a BR Banbury made by Farrel Corp. at a temperature ranging from 180° C. to 205° C. This mixture, referred to herein below as "Product A" contained about 15% MMA/BMA, 70% E/VA/CO, and 15% carbon black. Product A was cut into about ⅛ inch cubes and then ground to less than 35 mesh average particle size using a Bantam Mikro-Pulverizer.

480 g of Product A was then combined with 960 g of the same MMA/BMA copolymer used above and 192 g of an E/VA/CO terpolymer having a weight percent proportion of 66/23/11 and a melt index of 35 (designated Polymer 1 hereinafter) that had been preground to less than 35 mesh. The resulting powder, designated POWDER I, contained about 63% MMA/BMA copolymer, 21% E/VA/CO (71/26/3) terpolymer, 12% E/VA/CO (66/23/11) terpolymer and 4% carbon black.

408 g (25.5 weight percent) of Powder I was mixed with 1192 g (74.5 weight percent) of a masterbatch of polyvinyl chloride containing lubricants, stabilizers and sufficient Ketjenblack EC carbon black such that the resulting blend contained 15% carbon black. The mixture was blended in a BR Banbury using the following conditions: The initial temperature employed was 80° F. and a speed of rotation of 42 rpm was used. No external source of heat was applied. After 60 seconds the speed of rotation was raised to 62 rpm; a corresponding rise in temperature to 110° F. occurred. After about five minutes of mixing at 62 rpm, melting began at 230°–250° F. During this period the pressure on the ram was increased to 40 psig at a rate such that the machine would not overload. The speed of rotation was increased to 85 rpm for one minute, then raised to 125 rpm in two steps and held at 125 rpm for 15 seconds. The temperature rose to approximately 280° F. The melted product was then passed through a 2 roll mill at 60°± 5° C. and broken into small pieces for testing.

Table I below shows the properties of eight blends of this invention. It is noted that the blends of Examples 1, 2 and 3 were prepared as described above and that the blends of Examples 4, 5, 6, 7 and 8 were prepared by a procedure like that described above except that the acrylic polymer was not added until Polymer 1 was added.

ment in heat distortion temperature at some sacrifice in toughness and melt viscosity).

EXAMPLES 9–11

A mixture containing 1400 g of E/VA/CO (71/26/3) with a melt index of 0.3, 300 g of acrylic polymer 70/30 methyl methacrylate/n-butyl methacrylate copolymer with an I.V.=0.18±0.02 and a Tg of 74° C., and 300 g of Ketjenblack EC carbon black was dry blended on a roll mill for one hour and then melt blended on a 6 inch 2-roll mill at 190° C. for twenty minutes. This blend (blend C hereinafter) was removed from the mill as a

TABLE I

| Example | Acrylic Polymer (%) IV, (Tg°C.) | Powder I % | PVC* | Melt-Viscosity M-G | Tensile-Work to Break % XmPa | Heat Distortion Temperature °C. |
|---|---|---|---|---|---|---|
| 1 | MMA/BMA (70/30); 0.18; (74) | 25.5 | 74.5 | 1770 ± 10 | 52.1 | 66 |
| 2 | MMA/BMA (70/30); 0.18; (74) | 28.4** | 71.2 | 1690 ± 10 | 55.3 | 65 |
| 3 | MMA/BMA (70/30); 0.18; (74) | 31.1** | 68.1 | 1660 ± 10 | 81.5 | 69 |
| 4 | MMA/EA (83/17); 0.22; (70) | 25.5 | 74.5 | 1850 ± 10 | 57.2 | 67 |
| 5 | EMA (100); 0.19; (52.5) | 25.5 | 74.5 | 1760 ± 10 | 38.4 | 65 |
| 6 | MMA (100); 0.20; (94) | 25.5 | 74.5 | 2000 ± 10 | 30.5 | 69 |
| 7 | MMA/S (60/40); 0.58; (99) | 25.5 | 74.5 | 2060 ± 10 | 45.5 | 69 |
| 8 | MMA/BMA/EA 39/60/1 0.26; (46) | 25.5 | 74.5 | 1690 ± 10 | 54.5 | 62 |
| Control PVC/Carbon Black (15%) | | — | — | 1780 ± 30 | 39.3 | 61 |

MMA - methyl methacrylate;
BMA - butyl methacrylate,
EA - ethyl acrylate,
EMA - ethyl methacrylate,
S - styrene,
PVC - polyvinyl chloride
*wt % masterbatch
**Example 2 contains an additional 0.4% wt - Ketjenblack EC
Example 3 contains an additional 0.8% wt - Ketjenblack EC Table I illustrates the various improvements in heat distortion temperature, toughness and melt viscosity obtained using the compositions of the invention. Preferred compositions (Examples 2 and 3) show significant improvements in all three properties. Most other examples show significant improvements in two of the three properties. (Example 6 shows significant improvement sheet approximately ⅛-inch thick and then cut into essentially cube shape. 115 g of this blend C, 43 g of Polymer 1, 231 g additional acrylic polymer (70/30-MMA/BMA copolymer) and 1211 g of the PVC masterbatch described in Examples 1–8 were blended in a BR Banbury using the procedure described in the Examples 1–8. In like manner two other blends described in Table II, part 2 and 3, with differing ratios of these ingredients were prepared.

TABLE II

| | Wt. % | | | | | Work | Heat Distor- |
|---|---|---|---|---|---|---|---|
| Example | Blend C | Polymer 1 | Acrylic Polymer | PVC Masterbatch | Melt Visc. M-G | To Break % XmPa | tion Temp., °C. |
| 9 | 7.2 | 2.7 | 14.4 | 75.7 | 1260 ± 20 | 45.8 | 61° C. |
| 10 | 5.5 | 2.8 | 14.7 | 77.0 | 1330 ± 20 | 45.0 | 67° C. |
| 11 | 8.9 | 2.7 | 14.2 | 74.3 | 1320 ± 40 | 50.7 | 64° C. |

TABLE II-continued

| Example | Blend C | Polymer 1 | Acrylic Polymer | PVC Masterbatch | Melt Visc. M-G | Work To Break % XmPa | Heat Distortion Temp., °C. |
|---|---|---|---|---|---|---|---|
| Control-PVC/Carbon Black (15%) | | | | | 1640 ± 60 | 27.4 | 56° C. |

Blend C contained about 15% MMA/BMA, 70% E/VA/CO (71/26/3) and 15% carbon black. The final product (blended PVC) contained about 5% (Ex. 9) E/VA/CO (71/26/3) and about 15% carbon black.

To compare the PVC blends made in Examples 9-11, identical blends were prepared except that the E/VA/CO (71/26/3) was omitted. Results are shown in comparison Table II-A below. In comparison A, Polymer 1 was omitted also.

TABLE II-A

| Comparison | Acrylic Polymer | Polymer 1 | PVC Masterbatch | Melt Visc. M-G | Work To Break (Product) % XmPa | HDT, °C. |
|---|---|---|---|---|---|---|
| A | 12.9 | 0 | 87.1 | 1480 ± 20 | 20.8 | 64.5 |
| B | 12.6 | 2.0 | 85.4 | 1320 ± 20 | 23.9 | 64.5 |
| C | 12.5 | 3.0 | 84.5 | 1310 ± 30 | 31.0 | 64.5 |
| D | 12.4 | 4.0 | 83.7 | 1270 ± 40 | 32.6 | 64.0 |
| E | 0 | 0 | 100 | 1400 ± 20 | 25.0 | 57.0 |

As is seen the melt viscosity of Comparison Blend A (which contains no E/VA/CO (71/26/3) or E/VA/CO 66/23/11) is much higher than in either Comparison Blends B, C and D or Example Blends 9, 10 or 11. As is also seen, the tensile properties (work-to-break) of the comparison blends [which do not contain E/VA/CO (71/26/3)] are not as good as these of Examples 9, 10 or 11 [which do contain E/VA/CO (71/26/3)].

EXAMPLES 12-16

The following Examples of this invention, compare the effect of blending of the compositions in different ways.

The compositions in Table III below all contain the same proportion of ingredients; 16.2 weight percent acrylic polymer, 3.1 weight percent E/VA/CO (66/23/11), M.I. 35 and 5.2 weight percent E/VA/CO (71/26/3), M.I. 0.3 but differ in physical form in which they were added. Examples 12 and 13 involved no precompounding of carbon black with E/VA/CO (71/26/3) and both E/VA/CO terpolymers were added directly as pellet and powder respectively. Number 14 is a duplicate of Example 8. In Examples 15 and 16, both E/VA/CO terpolymers were added as a premelt blended additive. All the Blends of Examples 12-16 contained A. 16.2 weight percent MMA/BMA (70/30) Acrylic Polymer
B. 3.1 weight percent Et/VA/CO (66/23/11)
C. 5.2 weight percent Et/VA/CO (71/26/3)
D. 15.0 weight percent carbon black
E. 60.0 weight percent PVC Masterbatch In Examples 12 and 13 no preblending of any components was carried out. All the components were mixed in a BR Banbury mixer, as in Example 1. In Example 12, Components B and C were added in pellet form, and in Example 13, in powder form. In Example 14, the acrylic polymer A was preblended as in Example 8. In Examples 15 and 16, both Components B and C were added as a premelt blended additive. In Example 15, this preblend contained 26 weight percent Component C, 48.5 weight percent Component B, 10.5 weight percent 70/30-MMA/BMA copolymer and 15 weight percent Ketjenblack EC carbon black. The preblended product in Example 16 consisted of 29.7 weight percent Component C, 55.3 weight percent Component B, and 15.0 weight percent Ketjenblack EC carbon black. Both preblends were prepared in a BR Banbury using a procedure like that of Example 1.

TABLE III

| EXAMPLE | PHYSICAL FORM OF COMPONENTS B AND C | MELT VISC. M-G | WORK TO BREAK % XmPa | HDT, °C. |
|---|---|---|---|---|
| 12 | C and B added directly as powder | 1520 ± 10 | 58.3 | 66 |
| 13 | C and B added directly as pellets | 1470 ± 10 | 83.1 | 67 |
| 14 | B preblended, C, added as a powder | 1550 ± 10 | 93.7 | 67 |
| 15 | B and C preblended with acrylic and carbon black | 1640 ± 5 | 56.7 | 66 |
| 16 | B and C preblended with carbon black | 1600 ± 10 | 103.1 | 67 |

It is seen that the manner of addition of the E/VA/CO terpolymers (Component C is 71/26/3), melt index 0.3 terpolymer and Component B is the 66/23/11, melt index >35 terpolymer) has an effect on the work-to-break values obtained.

I claim:

1. A molding blend consisting essentially of
   (a) polyvinyl chloride
   (b) about 5-25% by weight of blend of at least one acrylic polymer having a glass transition temperature of between about 45°-105° C. and an inherent viscosity between 0.1-0.6, said polymer containing units derived from

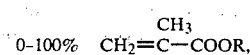

0-100% $CH_2\!=\!\underset{\underset{CH_3}{|}}{C}\!-\!COOR$,

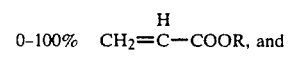

0-100% $CH_2\!=\!\underset{\underset{H}{|}}{C}\!-\!COOR$, and 0-50% styrene, in which the total percent of the monomer units is 100% and R is alkyl of 1-18 carbons;
   (c) about 1-10% by weight of blend of a high melt index terpolymer derived from units (by weight) of 60-80% ethylene, 5-60% copolymerizable unsaturated monomer, and 3-30% carbon monoxide, said terpolymer having a melt index over 20;

(d) about 1-15% by weight of blend of a low melt index terpolymer derived from units (by weight) of 60-80% ethylene, 5-60% copolymerizable unsaturated monomer, and 3-30% carbon monoxide, said terpolymer having a melt index less than 1; and (e) about 2-20% by weight carbon black.

2. The blend of claim 1 wherein the polymer defined as Component (b) is a polymer consisting of units derived from 0-100% $CH_2=CCH_3-COOR$ and 0-100% $CH_2=CH-COOR$.

3. The blend of claim 1 wherein the polymer defined as Component (b) is a polymer containing units derived from 10-90% $CH_2=CCH_3-COOR$ and 90-10% $CH_2=CH-COOR$.

4. The blend of claim 1 wherein the polymer defined as Component (b) is a polymer containing units derived from 100% $CH_2=CCH_3-COOR$.

5. The blend of claim 1 wherein the polymer defined as Component (b) is a copolymer of methyl methacrylate and butyl methacrylate in a proportion of 50/50 to 85/15 by weight.

6. The blend of claim 1, 2, 3, 4 or 5 wherein in each of Components (c) and (d), the copolymerizable unsaturated monomer is a vinyl ester of a saturated carboxylic acid wherein the acid group has 1-18 carbon atoms.

7. The blends of claim 1, 2, 3, 4 or 5 wherein in each of Components (c) and (d) the terpolymers are derived from units of 56-76% ethylene, 10-34% vinyl ester of saturated carboxylic acid wherein the acid group has 1-18 carbon atoms, and 3-15% carbon monoxide.

* * * * *